United States Patent
Varma et al.

(10) Patent No.: US 10,846,701 B1
(45) Date of Patent: Nov. 24, 2020

(54) MULTI-VECTOR AUTHENTICATION UNIT (MVAU)

(71) Applicant: Bank of America Corporation, Charlotte, NC (US)

(72) Inventors: Jayachandra Varma, Irving, TX (US); Gilbert Gatchalian, Union, NJ (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 31 days.

(21) Appl. No.: 16/408,561

(22) Filed: May 10, 2019

(51) Int. Cl.
*G06Q 20/40* (2012.01)
*G07F 19/00* (2006.01)

(52) U.S. Cl.
CPC ..... *G06Q 20/4016* (2013.01); *G06Q 20/4093* (2013.01); *G06Q 20/40145* (2013.01); *G07F 19/201* (2013.01); *G07F 19/207* (2013.01)

(58) Field of Classification Search
CPC ......... G06Q 20/08; G06Q 20/18; G06F 17/00
USPC ........................ 235/381, 375, 380; 705/5, 43
See application file for complete search history.

(56) References Cited

U.S. PATENT DOCUMENTS

| | | |
|---|---|---|
| 6,651,168 B1 | 11/2003 | Kao et al. |
| 7,188,360 B2 | 3/2007 | Gerdes et al. |
| 7,735,125 B1 | 6/2010 | Alvarez et al. |
| 7,748,028 B2 | 6/2010 | Sato et al. |
| 8,335,487 B2 | 12/2012 | Wen et al. |
| 9,203,841 B2 | 12/2015 | Neuman et al. |
| 9,736,154 B2 | 8/2017 | Wilson et al. |
| 2003/0023555 A1 | 1/2003 | Rees |
| 2005/0015286 A1* | 1/2005 | Rudnik ................... H04N 5/765 348/143 |
| 2007/0079136 A1* | 4/2007 | Vishik ................... H04L 9/3231 713/186 |
| 2007/0087834 A1* | 4/2007 | Moser ................. G07F 17/3237 463/42 |
| 2008/0195540 A1* | 8/2008 | Gee ..................... G06Q 20/1085 705/43 |
| 2010/0205100 A1* | 8/2010 | Hurley .................... G06Q 30/06 705/80 |
| 2011/0191156 A1* | 8/2011 | Etheredge .......... G06Q 30/0224 705/14.25 |
| 2017/0308909 A1* | 10/2017 | Faith .................. G06Q 30/0201 |
| 2020/0034807 A1* | 1/2020 | Shamai ................ G06Q 20/325 |

* cited by examiner

*Primary Examiner* — Edwyn Labaze
(74) *Attorney, Agent, or Firm* — Weiss & Arons LLP; Michael A. Springs, Esq.

(57) ABSTRACT

Aspects of the disclosure relate to electronically detecting and responding to a security risk associated with a non-electronic transaction. These aspects include recording and storing a video of a customer entering a financial institution (FI). Upon review of the video, the method confirms that the customer is a legacy customer and then deletes the video, or confirms that the customer is a non-legacy customer. If the customer is a non-legacy customer, the method stores the video for an amount of time sufficient to quantify a security risk associated with the customer. The method may then use an input device including at least one customer-imperceptible biometric sensor to retrieve information about the customer. The method compares the stored video to the biometric information to adjust a level of the security risk associated with the customer or transaction. If the security risk is lower than a threshold, the method may delete the video.

18 Claims, 6 Drawing Sheets

MULTI-VECTOR AUTHENTICATION UNIT (MVAU)

FIELD OF TECHNOLOGY

Aspects of the disclosure relate to efficiently processing and maintaining security of non-electronic transactions. Specifically, the disclosure relates evaluating security risk associated with non-legacy financial institution (FI) customers.

BACKGROUND OF THE DISCLOSURE

Non-legacy customers of a financial institution—colloquially referred to as, "walk-ins"—typically provide only a small amount of a financial institution's (FI) business. Yet these non-legacy customers provide a disproportionately high amount of security risks and financial risks to the FI.

Because these non-legacy customers provide a disproportionately high amount of security risks and financial risks to the FI, a disproportionate amount of resources must be diverted to attend to these risks. It would be desirable to provide systems and methods for monitoring, and, when necessary, responding to, security risks associated with non-legacy customer activity in an FI.

SUMMARY OF THE DISCLOSURE

Aspects of the disclosure relate to a system for detecting and responding to a security risk associated with a non-electronic transaction.

The system may include a video camera configured to video an incoming customer at a financial institution (FI). The customer is associated with the non-electronic transaction. The system may be further configured to store the video. The video may be stored in the video camera or in some other relevant device.

Upon confirmation that the customer is a legacy customer, the system may delete the video. Upon confirmation that the customer is a non-legacy customer, the video may be deleted preferably after the greater of a) a time value associated with a first pre-determined amount of time and b) a time value associated with a second pre-determined amount of time. The second pre-determined amount of time should preferably be proportional to a level of a security risk associated with the customer—i.e., the greater the security risk associated with the customer, the longer the video is stored.

The system may also include an input device comprising at least one imperceptible biometric sensor. The imperceptible biometric sensor may preferably monitor and retrieve biometric information about the customer. The system may also include a computer configured to compare the stored video to the biometric information. In response to the comparison, the computer may execute an application for responding to the security risk associated with the customer.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
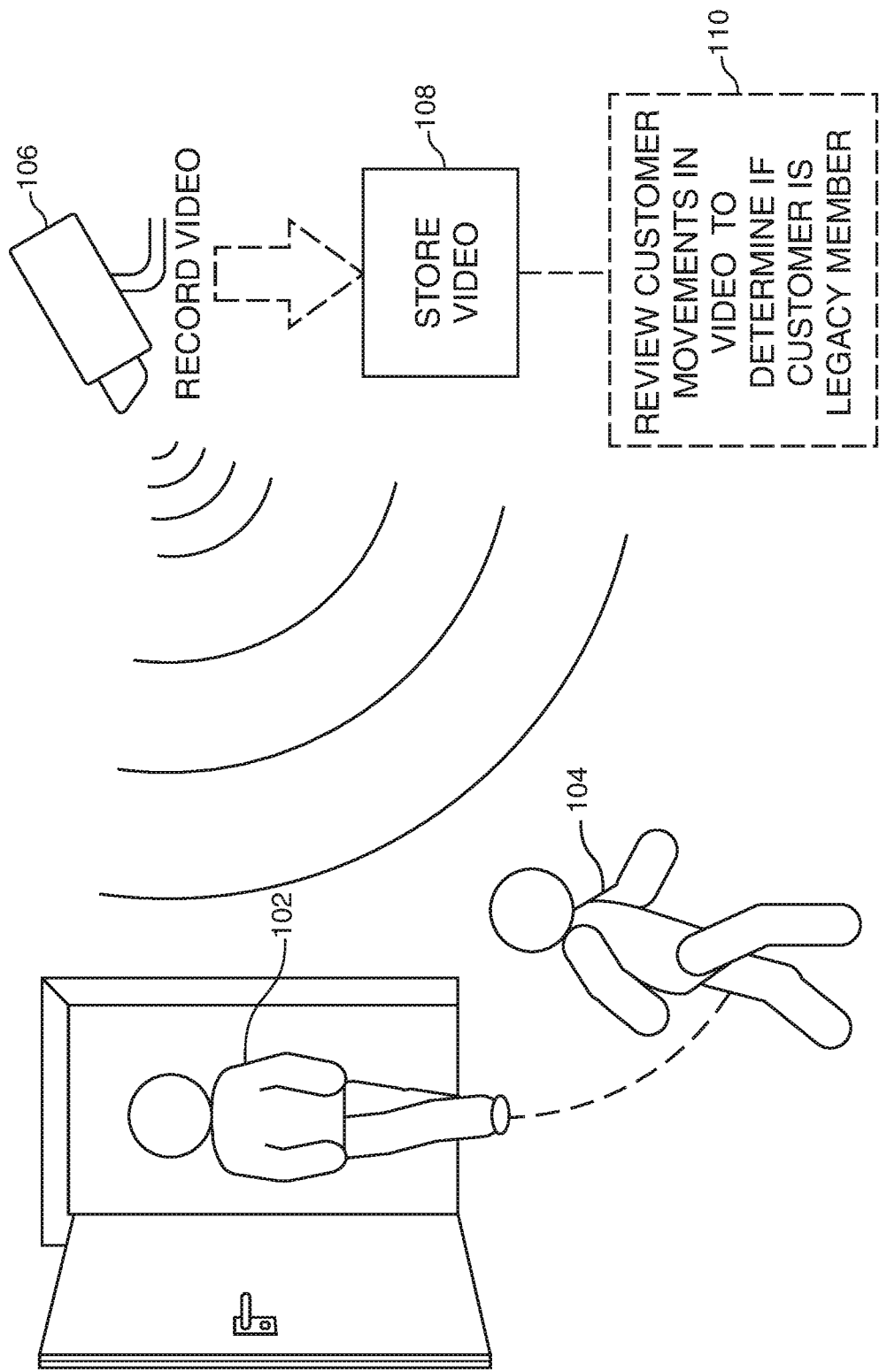
FIG. 1 shows a schematic illustration of videoing and analyzing a customer's movements as he or she enters a financial institution (FI).

Today's increasingly technological economy requires the ability to be able to securely process non-digital (paper) transactions as close to the source of the transaction as possible. Furthermore, more data authentication is needed than ever before.

For example, people that may have never personally encountered one another may become linked in one or more direct/indirect ways. In certain of these relationships, one or more of these people may choose to maintain a paper transaction method with one primary and/or secondary party belonging to a financial institution (FI). An FI representative may be required, however, to take time and substantial resources away from an FI customer to process the paper transactions.

In view of the foregoing, some embodiments may limit a non-FI customer (referred to herein, in the alternative, as "a non-legacy customer") to specific, highly secure, interactions with the FI. Thus, the non-legacy customer may then be limited when interacting with the FI even for simple tasks. Such a system can also preferably be leveraged during disaster or other events, as will be explained in more detail below.

In one example, Example 1, a paper check, in order to be cashed in an FI, requires personal interaction with a teller. Waiting in line and a lengthy interaction with a teller can be time- and resource-consuming and may take away from the non-legacy customer's overall experience. A non-legacy customer's heightened security risk profile further complicates the authentication process. An unknown actor could leverage one or more illegal schemes (unauthorized/invalid signature, etc.) to gain access to the funds.

In example 1, a system according to certain embodiments of systems according to the disclosure can be mounted at a designated location to do most, if not all the pre-processing, and then allow the non-legacy customer to proceed to provide some other identification or authentication means to collect the funds. In this embodiment, the systems at the designated location can perform some biometric analysis using facial recognition, fingerprint recognition, voice recognition, and/or other suitable biometric identification information retrieval. The results would then be compared against known/unknown reputable actors. Such comparison may be implemented using relevant private/public records.

During the pre-processing, the non-legacy customer may be asked to present an ID as he or she walks by the unit. In certain embodiments, there could also be systems configured to reach out, transparently to the non-legacy customer, to the issuer of authentication provided by the non-legacy customer to confirm validity of the paper transaction. Examples of such reaching out to a non-legacy customer may include receiving a driver's license, and contacting the relevant Department of Motor Vehicles to verify the authenticity of the driver's license.

Once the non-legacy customer's identity has been confirmed, the non-legacy customer can interact with a human teller or choose to enter, or otherwise interact with, a multi-vector authentication unit (MVAU) as set forth in more detail herein in order to proceed with secondary authentications or transactions.

A series of steps as set forth herein below provides steps for use in possible methods of interactions according to methods.

1. Use video camera to video customer to compare video to historical video records to make an initial determination as to whether customer is a legacy or non-legacy customer.

2. Utilize additional information retrieval to prevent non-legacy customer from traversing initial determination.

3. Re-scan non-legacy customer and compare with a photo ID; also compare photo ID with issuing agency, respective state or federal database, fraud lists, etc.

4. Leverage Artificial Intelligence (AI)/Machine Learning (ML) to analyze non-legacy customer and legacy customer for direct/indirect relationship for possibility of potential fraudulent behavior. This step may include the ability to pass relevant security-related information to a human teller, or other contact person, as needed.

5. MVAU may also scan a paper check electronically—in order to extract, in the case of a digital check, the check token to confirm that the check is authentic.

6. MVAU also may include secondary post-processing capabilities like the ability to issue payment to another designated person or entity, or send a purchase list to a seller and pay with some of the funds on the check.

For example, a contractor may want to cash a check from a customer and then use it to purchase supplies. The FI can then forward the supplies list and issue the payment while sending a copy of the receipt from the seller to both parties via email or other electronic means.

7. MVAU can then complete the non-legacy customer transaction and offer, and/or enable, the user to register as a legacy user for faster access on subsequent visits.

MVAU and its accompanying systems can be moved to various location and adapted for use there. For example, at a convenience store the first stage of authentication could be attached to the store's entrance and feed the data by wire, or wirelessly, to MVAU. Each of the accompanying systems can be placed around the store to track behavior and report any non-verbal cues (nervousness, threatening situations, etc.)

MVAU would have the ability to detect changes in re-introduction of a paper artifact, such as a check. For example, a non-legacy customer attempts to cash the check and then tries to alter the amount on the check or otherwise re-use the check if the check was sent back after a failed transaction. Such a flagged transaction could also be picked up by MVAU as a possible flag of potentially, or actual, fraudulent behavior.

In some embodiments, some biometric analysis using facial, fingerprint, voice, etc., may be performed upon entrance, and/or registration, of a customer to an FI. This could this occur via beacon, video, or other method such as a device not yet known.

This includes multiple embodiments as follows: 1) all or a combination of the devices mentioned above or 2) MVAU could start with a basic authentication and progressively take the user seamlessly through verifications as the user interacts with the system. The results of one or more of these embodiments could then be compared against known/unknown potentially fraudulent actor using private/public records.

In certain embodiments, there could be inner components. These inner components may be preferably hidden within user input devices. These inner components can read the needed inputs—fingerprint, iris, facial, etc. via scanners located or situated below an interactive screen or within another suitable device. There could also be an opportunity to silently monitor the issuer to confirm validity of the paper transaction. For example, systems may silently reach out to the user when the user is touching the screen. A scanner could read a fingerprint and/or iris of the user, and compare against known databases on fraudulent activity. During the pre-processing the non-legacy customer may be asked to present an id as he or she passes a unit according to the embodiments. The ID is then run against the issuing authority (DMV, etc.). The system could preferably have multiple layers as explained earlier to take different inputs and leverage re-combinatory analytics to combine those inputs to determine different continuation points. For example, one successful point may only process/permit certain transactions, while another point may allow the inputs of the first to be combined with the next set and then a further analysis is done to determine if other transactions may be processed.

Multi-layered systems that can automatically process an action for a non-legacy by relying on different transitioning inputs which may be provided during the workflow process. Each layer can auto-shift a user to be monitored for on-going analysis to complete or cancel a transaction.

Some embodiments are directed to a multi-vector authentication unit (MVAU) where a non-legacy customer can automatically process paper checks and other transactions.

This system differs from a virtual teller, in that these embodiments of the system are providing an alternate processing agent that can seamlessly vary its authentication/authorization/verification during a process so a potentially fraudulent actor is unaware that his or her actions are constantly being monitored and/or tested. The system preferably performs a varied amount of authentication, authorization processing, and other pre-processing and post-processing tasks.

Thus, systems and methods are provided whereby a non-legacy customer of the FI can efficiently and securely process paper checks and other transactions. It may include a virtual assistant that can perform a varied amount of authentication, authorization processing, and other pre-processing and post-processing tasks, absent additional, system-side integration.

Systems and methods for detecting and responding to a security risk associated with customer performing a non-electronic transaction are provided. A system according to certain embodiments may include a video camera. The video camera may be configured to video an incoming customer at a financial institution. The customer may be associated with the non-electronic transaction.

The video camera may be further configured to store the video. Upon confirmation that the customer is a legacy customer, the video camera, and/or devices associated therewith, may be configured to delete the video. Upon confirmation that the customer is a non-legacy customer, the video camera, and/or devices associated therewith, may be configured to delete the video after the lesser of a) a time value associated with a first pre-determined amount of time and b) a time value associated with a second pre-determined amount of time, the second pre-determined amount of time that is proportional to a level of a security risk associated with the customer.

Systems according to certain embodiments may also include an input device. The input device may preferably include at one or more than one customer-imperceptible biometric sensor(s). The imperceptible biometric sensor(s) may be configured to monitor and retrieve biometric information about the customer. It should be noted that, while this disclosure is focused on customer-imperceptible biometric sensors, customer-perceptible biometric sensors may also be implemented either in combination with customer-imperceptible biometric sensors or independent of customer-imperceptible biometric sensors. As such, certain biometric sensors may be known to the customer, whereas others may be hidden from the customer. All these various combinations are within the scope of the disclosure set forth herein.

In addition, the systems may include a computer. The computer may be configured to compare the stored video to the biometric information. In response to the comparison, the computer may be configured to execute an application for responding to the security risk associated with the customer. Such an application may include an application to alert relevant authorities regarding the level of the security risk associated with the customer.

In some embodiments, the input device may be a quick service terminal. In such embodiments, the biometric sensor in the quick service terminal can monitor and record a group of physical metrics associated with an insertion of a credit-card sized item into the terminal.

The biometric sensor in the quick service terminal monitors and records a group of physical metrics associated with insertion of a credit-card sized item into the terminal. In certain embodiments, the group of physical metrics may include a metric associated with a determination of a left- or right-handedness of the customer. In certain embodiments, the group of physical metrics may include a metric associated with a determination of a speed of insertion of the credit-card sized item into the terminal. In some embodiments, the group of physical metrics may include a metric associated with a determination of a force of insertion of the credit-card sized item into the terminal. In certain embodiments, the group of physical metrics may include a metric associated with a determination of a direction and/or orientation of insertion with respect to the quick service terminal of the credit-card sized item into the terminal.

In some embodiments, the terminal may be configured to receive a credit-card sized identification instrument. The terminal may be further configured to, in response to receiving the credit-card sized identification instrument, contact an issuing agency associated with the credit-card sized identification instrument and verify the authenticity of the credit-card sized identification instrument.

In certain embodiments, the input device may be a keyboard. In some embodiments, the input device may be a mouse.

A method of electronically detecting and responding to a security risk associated with a non-electronic transaction is provided. The method may include recording, using a video camera, a video of a customer entering a financial institution. The video camera, and/or electronic devices associated therewith, may be further configured to store the video.

Upon review of the video, the method may include confirming that the customer is a legacy customer, and, pursuant thereto, deleting said video. Upon review of the video, the method may include confirming that the customer is a non-legacy customer.

In response to a determination that the customer is a non-legacy customer, the method may include storing the video for a pre-determined amount of time. The predetermined amount of time may preferably be sufficient to quantify a security risk associated with the customer.

In response to a determination that the security risk is lower than a threshold security risk, the method may then include deleting the video. In response to a determination that the security risk corresponds to a security risk equal to or greater than the threshold security risk, the method may include using an input device to retrieve biometric information about the customer. The input device may perform the retrieval using at least one imperceptible biometric sensor. The biometric information may have been obtained by the biometric sensor monitoring the customer.

The method may further include comparing the stored video to the biometric information to adjust, either upwards or downwards, the level of the security risk associated with the customer.

Methods of electronically detecting and responding to a security risk associated with a non-electronic transaction are provided. Certain methods may include recording, using a video camera, a video of a customer entering a financial institution. The video camera, and/or devices associated therewith, may further be configured to store the video—either in the camera or in a device or devices associated therewith.

Upon review of said video, the method may include 1) either confirming that the customer is a legacy customer, and, pursuant thereto, deleting said video, or confirming that the customer is a non-legacy customer. In response to a determination that the customer is a non-legacy customer, the method may then store the video for a pre-determined amount of time. The predetermined amount of time should preferably be sufficient to quantify a security risk associated with the customer. Part of quantifying the risk may include using an input device. The input device should preferably include at least one imperceptible biometric sensor to retrieve, preferably in real-time, biometric information about the customer.

The method may further include using a computer to compare the stored video to the biometric information to adjust, either upwards or downwards, the level of the security risk associated with the customer. In response to a determination that the security risk is lower than a threshold security risk, the methods may include deleting the video.

Specifics of a multi-vector authentication unit according to certain embodiments follow. The embodiments are described in conjunction with FIGS. 1-7.

FIG. 1 shows a schematic illustration of a financial institution ("FI") equipped with a video camera 106. A customer is shown entering the FI at a first location 102. The customer traverses the FI to a second location 104.

Video camera 106 preferably records the customer's movements within the FI. At step 108, after or simultaneous with the recording, video camera 106, or some other suitable device coupled to the video camera, stores the video of the customer's entry into the FI. At step 110, the stored video may be reviewed for an initial determination as to whether the customer is a legacy customer, a non-legacy customer, a known suspect customer or other individual known to the FI.

Figure 2:
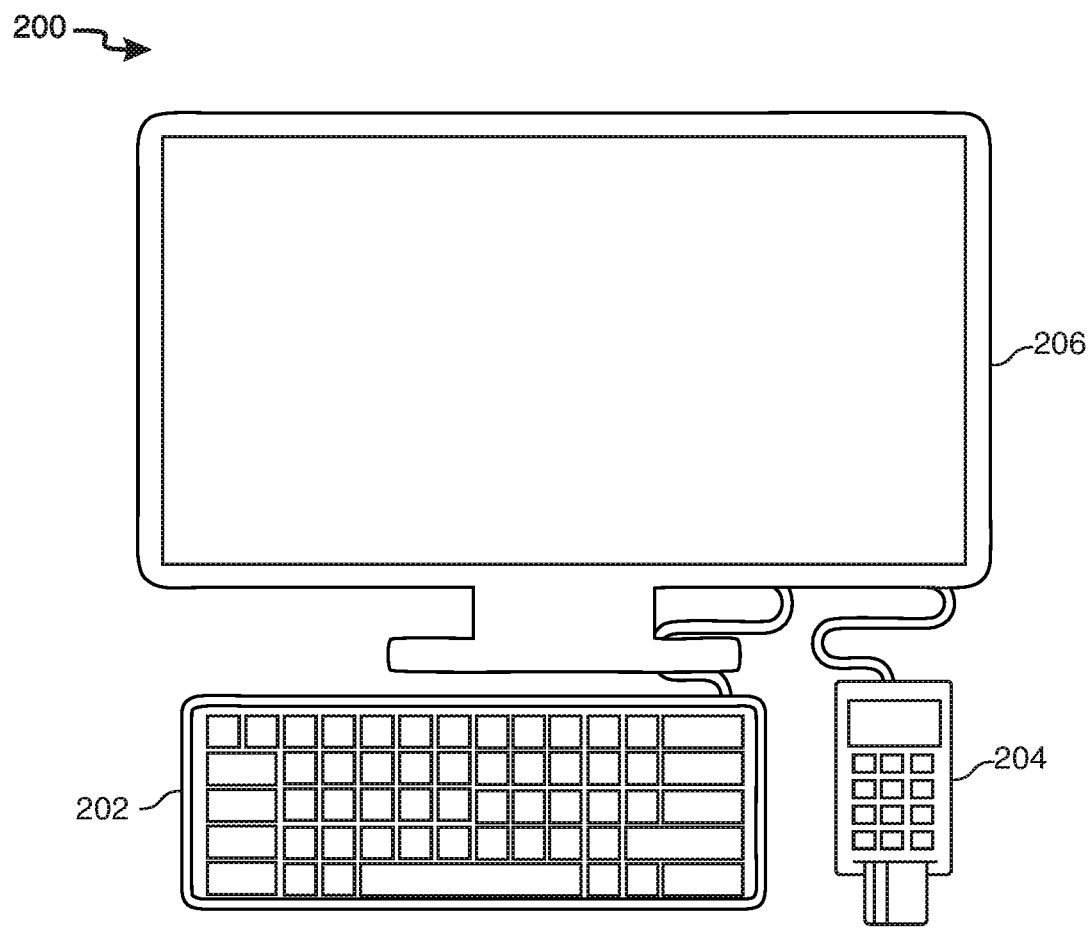
FIG. 2 shows a first set of input devices and a screen for use with certain embodiments.

FIG. 2 shows a system according to certain embodiments. System 200 may preferably include several devices, such as a keyboard 202, a quick service terminal ("QST") 204 and a screen 206. Each of keyboard 202, QST 204 and screen 206 may preferably include hidden components that are capable of obtaining biometric information about a user.

Such information may include fingerprint information, iris scan information, facial scan information, etc. Such information may be obtained via scanners below the surface or skin of one or more of the devices, via an interactive screen, or from beneath the surface of, or within, another suitable device.

Figure 3:
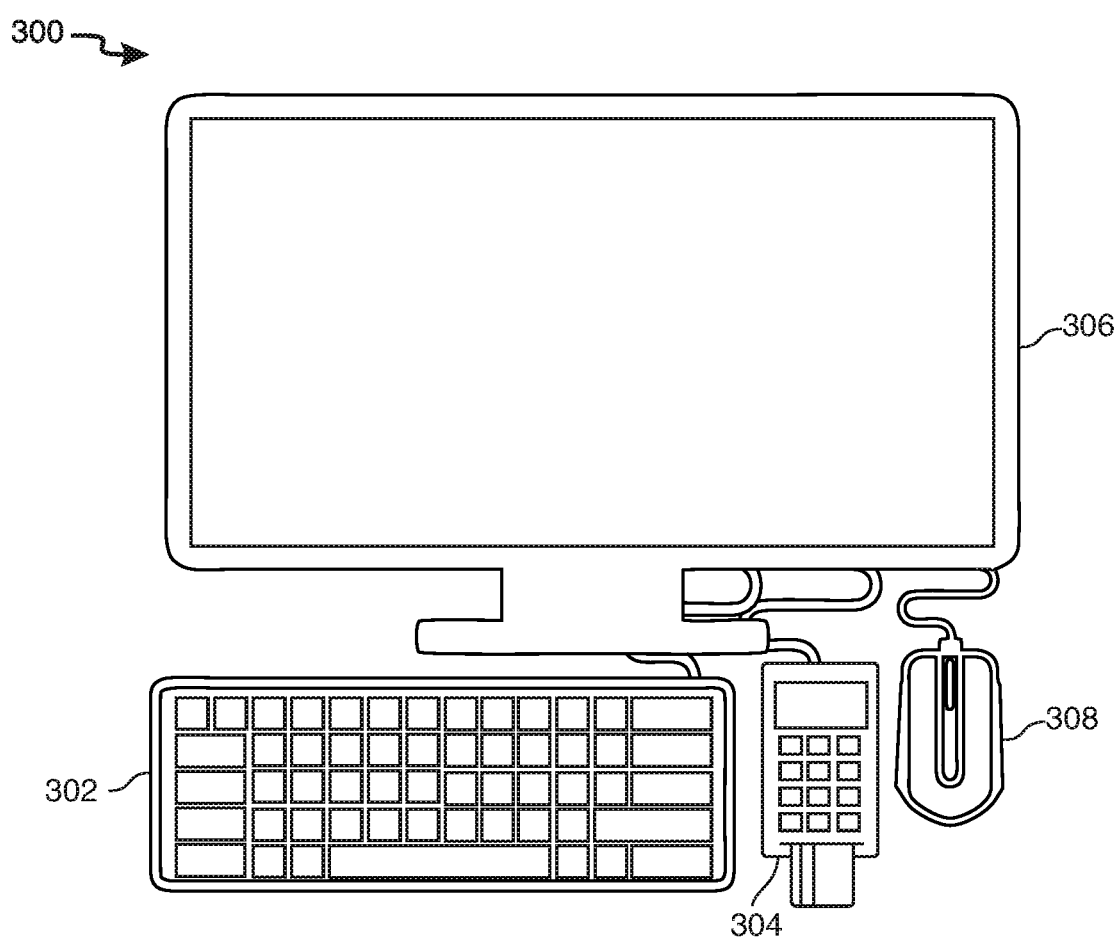
FIG. 3 shows a second set of input devices and a screen for use with certain embodiments.

FIG. 3 shows a system according to certain embodiments. System 300 may preferably include a keyboard 302, a QST 304, a screen 306 and a mouse 308. As described with respect to the devices shown in FIG. 2, each of keyboard 302, QST 304, screen 306 and mouse 308 may preferably include hidden components that are capable of retrieving biometric information about the user.

Figure 4:
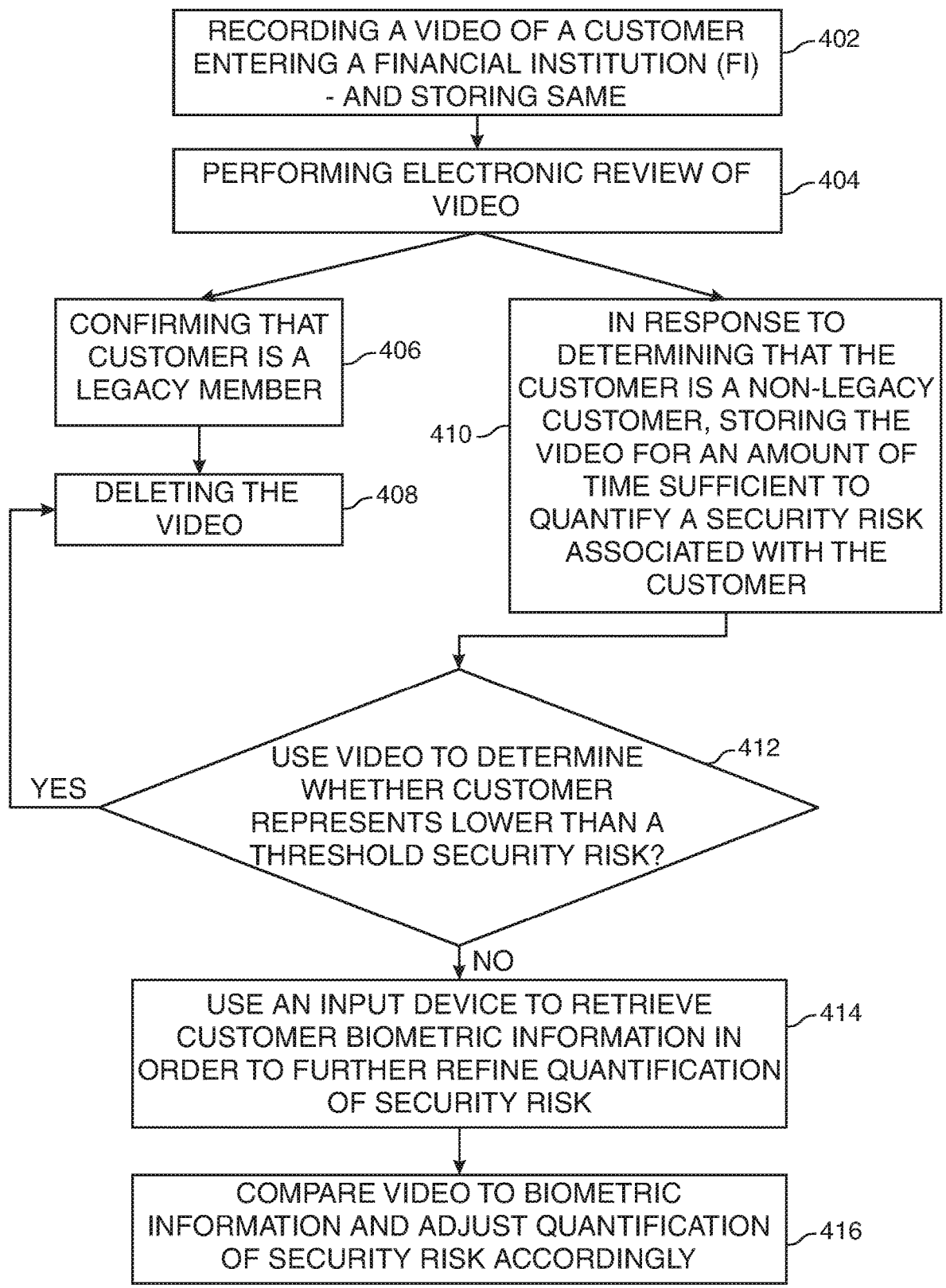
FIG. 4 shows an illustrative flow diagram in accordance with the principles of the disclosure.

FIG. 4 shows an illustrative flow diagram that shows method(s) involving an MVAU according to the disclosure. Step 402 shows recording a video of a customer entering an FI. Step 404 shows performing an electronic review of the recorded video. Step 406 shows confirming, at least in part via the review of the video (or independent of the review of the video), that the customer is a legacy FI member. Step 408 shows, in response to confirming that the customer is a legacy customer, deleting the video.

Step 410 shows an alternative pathway to the pathway shown in steps 406/408. Step 410 shows that, in response to determining that the customer is a non-legacy customer, the method may store the video for an amount of time sufficient to quantify (and, if necessary, react appropriately to) a security risk associated with the customer. Step 412 shows using the video to determine whether the customer represents a lower than threshold security risk. If so—then the method preferably deletes the video, as shown at 408, and carries on with the confirmed low-risk, albeit non-legacy, customer.

Step 414 shows that, following a determination that the customer fails to represent a lower than threshold security risk, the method may continue to use one or more input devices to retrieve customer biometrics in order to further refine quantification of the security risk associated with the customer.

Step 416 shows comparing the video to the retrieved biometric information and adjusting the quantification of the security risk accordingly.

Figure 5:
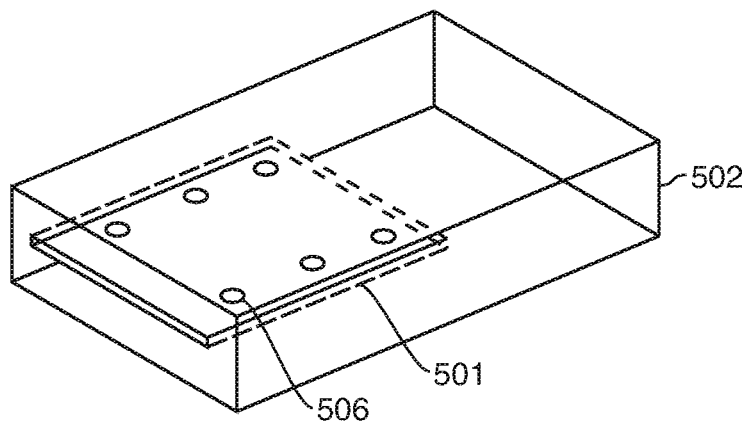
FIG. 5 shows a Quick Service Terminal (QST) with sensors in accordance with the principles of the invention.

FIG. 5 shows a QST 502 according to certain aspects of the disclosure. QST 502 preferably includes a card slot 501 for inserting a credit card, debit card, ID card or other preferably appropriately form-factored device.

In the embodiment shown in FIG. 5, card slot 501 preferably includes motion sensors 506. Motion sensors 506 preferably determine the speed and orientation at which the card or other device is inserted into the QST. The speed and orientation of card insertion may, in certain circumstances, provide a unique digital signature. As such, the speed and orientation information may preferably help to identify the user and, if necessary, may be used to determine whether the user is associated with one or more historic occurrences of fraudulent behavior. Accordingly, QST motion and/or orientation sensors 506 may be used to obtain biometric information about a user and help quantify a security risk associated with a non-legacy customer.

Figure 6:
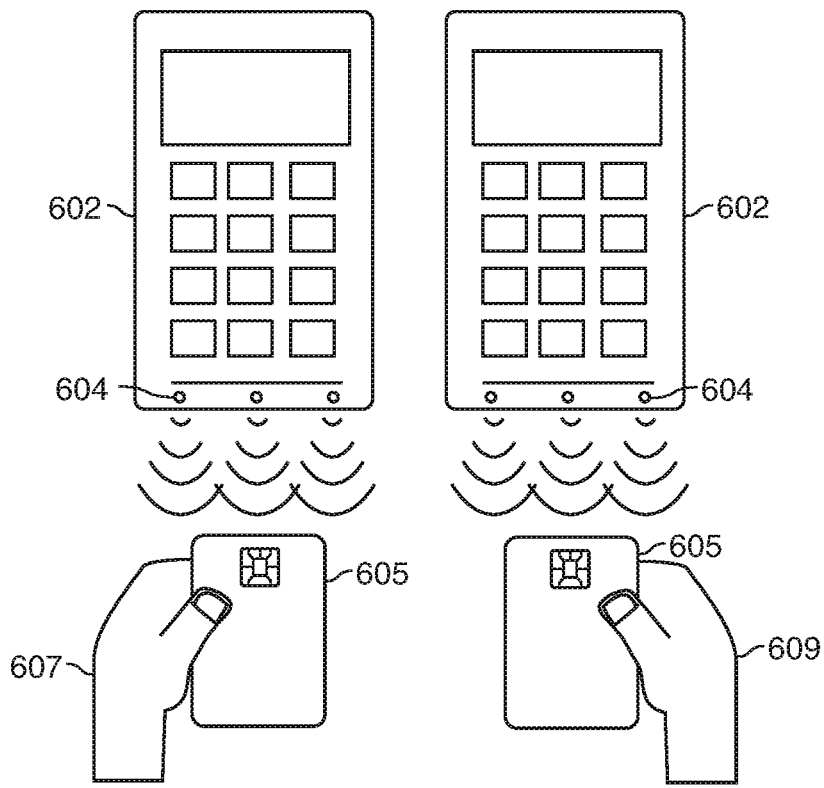
FIG. 6 shows another QST with (one or) more than one Near Field Communication (NFC) sensors in accordance with the principles of the invention.

FIG. 6 shows embodiments with QSTs 602. QSTs 602 include, in addition to, or independent of, sensors such as those shown in FIG. 5, Near Field Communication (NFC) sensors 604. Each of NFC sensors 604 may operate with radio waves to sense the motion of a card 605 as it is inserted into the QST 602. Such detection may preferably provide biometric information about a user. For example, such detection may provide information regarding whether the user is left-handed or right-handed. Such information may provide information regarding the height of the user—as the hand of a user 607 or 609 may approach the QST 602 from a distinct starting point. As such, NFC sensors 604 may preferably provide heretofore unharvested biometric information regarding a user vis-à-vis the user's use of a QST.

It should be noted that, with respect to the embodiment shown in FIG. 6, cards 605 should preferably include hardware and/or devices, such as passive or active RF devices or other suitable devices, which enable tracking of motion of cards 605 by NFC sensors 604.

Figure 7:
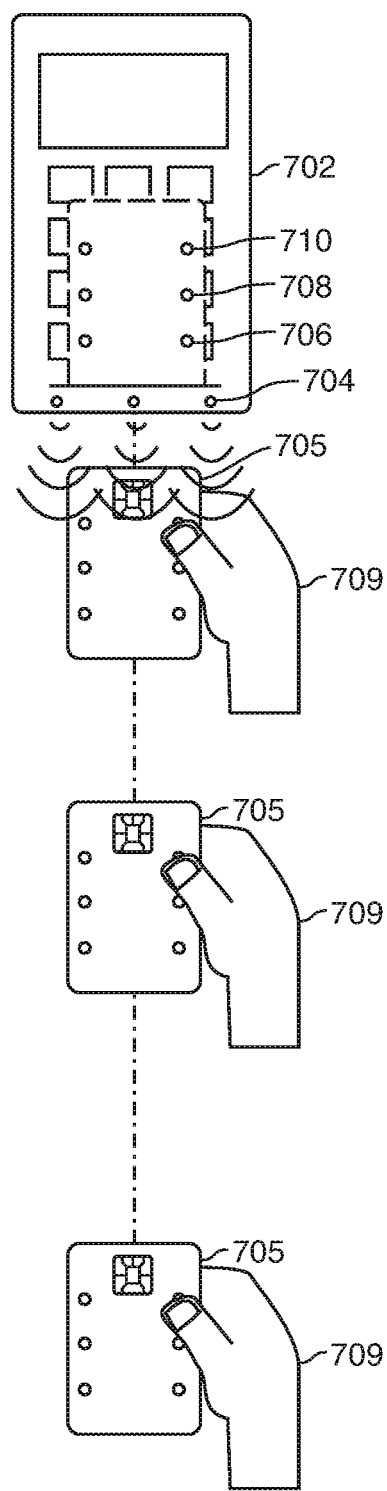
FIG. 7 shows yet another QST with multiple varieties of sensors in according with the principles of the invention.

FIG. 7 shows an embodiment of QST 702 including multiple sensors 704, 706, 708 and 710 capable of detecting aspects of the use of card 705. Sensors 704 may represent NFC sensors. Sensors 706 may represent motion detectors such as infra-red detectors. Sensors 708 may represent laser-based. Sensors 710 may be some other type of light-based sensors 708. It should be noted that use of the combination of some or all of the sensors in tandem may produce additional information regarding a user 709 of QST 702. As such, the biometric information obtained from QST 702 may include deeper and more important information regarding the security risk associated with a non-legacy customer than information derived from a single-sensor system, such as the system shown in FIG. 5.

It should be noted that, while the disclosure of these figures, and the portions of the specification associated therewith, focus on components hidden within the QST, such components and/or similar components, may also be located within the various keyboards shown herein (including the keyboard located on the QST, interactive (and non-interactive) screens associated with the devices described herein, the mouse shown herein and any other suitable devices, and/or locations associated with the systems and methods described in connection with the disclosure set forth herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for providing a multi-vector authentication unit are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for detecting and responding to a security risk associated with a non-electronically-initiated transaction, said system comprising:
a video camera configured to video an incoming customer at a financial institution, said customer associated with the non-electronic transaction, said video camera further configured to store said video and, 1) upon confirmation that the customer is a legacy customer, delete said video, and, 2) upon confirmation that the customer is a non-legacy customer, delete said video after the greater of a) a time value associated with a first pre-determined amount of time and b) a time value associated with a second pre-determined amount of time, the second pre-determined amount of time proportional to a level of a security risk associated with the customer;
an input device comprising at least one imperceptible biometric sensor, said imperceptible biometric sensor for retrieving biometric information about the customer, wherein:
the input device is a quick service terminal; and
the biometric sensor in the quick service terminal monitors and records a group of physical metrics associated with an insertion of a credit-card sized item into the terminal; and
a computer configured to compare the stored video to the biometric information and, in response to the comparison, execute an application for responding to the security risk associated with the customer.

2. The system of claim 1 wherein the group of physical metrics comprises a metric associated with a determination of a left- or right-handedness of the customer.

3. The system of claim 1 wherein the group of physical metrics comprises a metric associated with a determination of a speed of insertion of the credit-card sized item into the terminal.

4. The system of claim 1 wherein the group of physical metrics comprises a metric associated with a determination of a force of insertion of the credit-card sized item into the terminal.

5. The system of claim 1 wherein the group of physical metrics comprises a metric associated with a determination of an orientation of insertion with respect to the quick service terminal of the credit-card sized item into the terminal.

6. The system of claim 1 wherein the input device is configured to receive a credit-card sized identification instrument.

7. The system of claim 6 wherein the input device is configured, in response to receiving the credit-card sized identification instrument, to contact an issuing agency associated with the credit-card sized identification instrument and to verify the authenticity of the credit-card sized identification instrument.

8. The system of claim 1 wherein the input device further comprises a keyboard.

9. The system of claim 1 wherein the input device further comprises a mouse.

10. A method of electronically detecting and responding to a security risk associated with an on-site transaction, said method comprising:
recording, using a video camera, a video of a customer entering a financial institution, said video camera further configured to store said video;
upon review of said video, either confirming that the customer is a legacy customer, and, pursuant thereto, deleting said video, or confirming that the customer is a non-legacy customer;
in response to a determination that the customer is a non-legacy customer, storing the video for a pre-determined amount of time, said predetermined amount of time sufficient to quantify a security risk associated with the customer;
in response to a determination that the security risk is lower than a threshold security risk, deleting the video;
in response to a determination that the security risk corresponds to a security risk equal to or greater than the threshold security risk, using an input device comprising at least one imperceptible biometric sensor to retrieve biometric information about the customer, wherein the input device is a quick service terminal;
monitoring and recording, via the biometric sensor in the quick service terminal, a group of physical metrics associated with an insertion of a credit-card sized item into the terminal; and
comparing the stored video to the biometric information to adjust, either upwards or downwards, the level of the security risk associated with the customer.

11. The method of claim 10 wherein the group of physical metrics comprises a metric associated with a determination of a left- or right-handedness of the customer.

12. The method of claim 10 wherein the group of physical metrics comprises a metric associated with a determination of a speed of insertion of the credit-card sized item into the terminal.

13. The method of claim 10 wherein the group of physical metrics comprises a metric associated with a determination of a force of insertion of the credit-card sized item into the terminal.

14. The method of claim 10 wherein the terminal is configured to receive a credit-card sized identification instrument.

15. The method of claim 14 wherein the terminal is configured, in response to receiving the credit-card sized identification instrument, to contact an issuing agency associated with the credit-card sized identification instrument and to verify the authenticity of the credit-card sized identification instrument.

16. The method of claim 10 wherein the input device further comprises a keyboard.

17. The method of claim 10 wherein the input device further comprises a mouse.

18. A method of electronically detecting and responding to a security risk associated with a local transaction, said method comprising:
recording, using a video camera, a video of a customer entering a financial institution, said video camera further configured to store said video;

upon review of said video, either confirming that the customer is a legacy customer, and, pursuant thereto, deleting said video, or confirming that the customer is a non-legacy customer;

in response to a determination that the customer is a non-legacy customer, storing the video for a pre-determined amount of time, said predetermined amount of time sufficient to quantify a security risk associated with the customer;

using an input device comprising at least one imperceptible biometric sensor to retrieve biometric information about the customer, wherein the input device is a quick service terminal;

monitoring and recording, via the biometric sensor in the quick service terminal, a group of physical metrics associated with an insertion of a credit-card sized item into the terminal;

comparing, using a computer, the stored video to the biometric information to adjust, either upwards or downwards, a level of the security risk associated with the customer; and in response to a determination that the security risk is lower than a threshold security risk, deleting the video.

* * * * *